United States Patent
Mehalingam

(10) Patent No.: US 8,898,635 B2
(45) Date of Patent: Nov. 25, 2014

(54) SYSTEM AND METHOD FOR AUTOMATIC IMPACT VARIABLE ANALYSIS AND FIELD EXPANSION IN MAINFRAME SYSTEMS

(75) Inventor: Tamildurai Mehalingam, Chennai (IN)

(73) Assignee: Tata Consultancy Services Limited (IN)

( * ) Notice: Subject to any disclaimer, the term of this patent is extended or adjusted under 35 U.S.C. 154(b) by 229 days.

(21) Appl. No.: 13/445,977

(22) Filed: Apr. 13, 2012

(65) Prior Publication Data

US 2013/0042221 A1    Feb. 14, 2013

(30) Foreign Application Priority Data

Aug. 12, 2011    (IN) .......................... 2279/MUM/2011

(51) Int. Cl.
*G06F 9/44*    (2006.01)
*A01K 5/02*    (2006.01)
*G06F 9/45*    (2006.01)

(52) U.S. Cl.
CPC ...................................... *G06F 8/433* (2013.01)
USPC ........... 717/123; 717/121; 717/124; 717/125; 705/29

(58) Field of Classification Search
CPC ................................. G06F 11/008; G06F 8/78
See application file for complete search history.

(56) References Cited

U.S. PATENT DOCUMENTS

| | | | | | |
|---|---|---|---|---|---|
| 5,838,979 | A | * | 11/1998 | Hart et al. | 717/146 |
| 5,898,872 | A | * | 4/1999 | Richley | 717/121 |
| 6,071,317 | A | * | 6/2000 | Nagel | 717/128 |
| 6,110,224 | A | * | 8/2000 | Kawabe et al. | 717/131 |
| 6,233,728 | B1 | * | 5/2001 | Carter et al. | 717/124 |
| 6,240,546 | B1 | * | 5/2001 | Lee et al. | 717/131 |
| 6,629,313 | B1 | * | 9/2003 | Rowe et al. | 717/136 |
| 7,069,547 | B2 | | 6/2006 | Glaser | |
| 7,788,640 | B2 | * | 8/2010 | Grimaldi | 717/123 |
| 8,413,105 | B2 | * | 4/2013 | Adi et al. | 717/101 |
| 2003/0084063 | A1 | * | 5/2003 | DelMonaco et al. | 707/103 R |
| 2003/0172010 | A1 | * | 9/2003 | Butani et al. | 705/29 |
| 2006/0143594 | A1 | * | 6/2006 | Grimaldi | 717/123 |
| 2008/0022264 | A1 | * | 1/2008 | Macklem et al. | 717/136 |
| 2008/0196012 | A1 | * | 8/2008 | Cohen et al. | 717/125 |
| 2012/0110557 | A1 | * | 5/2012 | Singh et al. | 717/133 |
| 2014/0013304 | A1 | * | 1/2014 | Vangala et al. | 717/123 |
| 2014/0123108 | A1 | * | 5/2014 | Cheluvaraju et al. | 717/123 |

OTHER PUBLICATIONS

Edgar Sommer, "FENDER: An approach to theory restructuring", [Online], Springer 1995, pp. 356-359, [Retrieved from Internet on Jul. 11, 2014], <http://download.springer.com/static/pdf/350/chp%253A10.1007%252F3-540-59286-5_86.pdf>.*

(Continued)

*Primary Examiner* — Thuy Dao
*Assistant Examiner* — Ziaul A Chowdhury
(74) *Attorney, Agent, or Firm* — Merchant & Gould P.C.

(57) ABSTRACT

A system and method for field analysis, in an organization is described herein. According to the present invention, the system parses the software code to prepare an abstract syntax tree, extract attributes and relational report, load the report in a common repository, perform impact analysis on the said common repository based on user provided seed, and prepare the list of impacted variables. Further, if required the impacted fields are expanded based on the target size information provided.

14 Claims, 4 Drawing Sheets

(56) References Cited

OTHER PUBLICATIONS

Mohammad-Amin Jashki, et al., "Towards a More Efficient Static Software Change Impact Analysis Method",[Online], ACM 2008, pp. 1-7, [Retrieved from Internet on Jul. 11, 2014], <http://ebagheri.athabascau.ca/papers/paste.pdf>.*

Alessandro Orso et al., "Leveraging Field Data for Impact Analysis and Regression Testing", [Online], ACM 2003, pp. 1-10, [Retrieved from Internet on Jul. 11, 2014], <http://www.cc.gatech.edu/people/home/orso/papers/orso.term.harrold.FSE03.pdf>.*

Jean-plene Queille et al., "The Impact Analysis Task in Software Maintenance A Model and a Case Study", [Online], IEEE 1994, pp. 234-242, [Retrieved from Internet on Jul. 11, 2014], <http://ieeexplore.ieee.org/stamp/stamp.jsp?tp=&arnumber=336771>.*

Databorough Ltd., "Automated Field Re-engineering with X-Resize", Management Overview, A Guide to the Benefits of Using X-Resize, www.databorough.com, obtained from website on Apr. 28, 2014, 8 pages.

* cited by examiner

SYSTEM AND METHOD FOR AUTOMATIC IMPACT VARIABLE ANALYSIS AND FIELD EXPANSION IN MAINFRAME SYSTEMS

This application claims benefit of Serial No. 2279/MUM/2011, filed 12 Aug. 2011 in India and which application is incorporated herein by reference. To the extent appropriate, a claim of priority is made to the above disclosed application.

FIELD OF THE INVENTION

The invention generally relates to the field of impact variable analysis for mainframe or legacy applications. More particularly, the invention relates to a method and system for automatic impact variable analysis and field expansion analysis for mainframe applications.

BACKGROUND OF THE INVENTION

In the present scenario, a large number of companies still maintain software applications for mainframe systems. Such applications are also referred to as "Legacy applications". The examples of these applications include Banking operations, Computer-based reservation systems, Air traffic control and power grids etc. Generally, the operations involved in the execution of such applications are complex in nature and may require performing various critical functions thereby consuming more time and resources.

As a consequence of complex nature and critical functions handled by such applications, it is very difficult to replace them. Accordingly, companies maintaining these applications need to update them frequently. Generally, development and maintenance of these mainframe or legacy applications consumes more time. Thus, while updating these applications, it may be lead to cumbersome task and may require too much time. This is due to the fact that these applications were developed long time back and generally they lack proper documentation supporting the existence of the software code.

Generally, such updates in the mainframe/legacy applications are related to the size attribute of a variable that needs to be expanded according to the current business requirements. The expansion of attribute size of variable is referred to as "Field Expansion". The common reasons for "Field Expansion" are as follows:

Business Expansion:

As a result of business expansion, few of the most generally used variables or fields in the software code executing the business module requirements need to be changed or updated. In the manufacturing industry, such a field could be the Warehouse code, Depot code or Product code. These fields play a vital role in making decisions related to future strategies and planning of the business. For example, considering the manufacturing industry involved in a specific product manufacture, if the Product code field has a length of 2 digits, the system would not support beyond 99 products types.

Business Rules Change:

The software system is considered to be the backbone of many industries and has been implemented for automating various tasks facilitating business procedures. Thus, an impact on the business scenario would lead to changes to the software system driving them. This requires updating of such software with specific to fields or variables that may be impacted due to the impact in the business scenario. Such an update may comprise expansion of the impacted fields or variables termed as Field Expansion. Examples of business rules change include compliance to Government regulations, addition of multiple language support, and changes in the structure of product or other codes.

Oversight:

This may result as a consequence of oversight during the planning phase of software development. Example: Account number field size was set without keeping in mind the fact that it may grow in future to some extent.

Due to the reasons mentioned above, few of the existing entities get impacted in the software and as a consequence of this; there is a need to perform Field Analysis on such impacted entities. Further, if required, there is a need to expand the impacted entities by employing Field Expansion. The Field Analysis task is a complex as it is much more than simple analysis of fields. In the software program, the variables are interlinked with each other, various functions and other commands. Thus, the changes required in these variables can lead to changes in the entire business logic, data storage and the data retrieval options. The data related changes include, but not limited to fields, data structures, arrays and tables.

In the background art, the field analysis and thereby field expansion is a manual process. In this process, one or more software programmers manually conduct an analysis of the software to identify the impacted variables. This is referred to as impact analysis. Further, the field size of each of the identified impacted variables is modified manually based on the requirements.

Attempts have been made in the past to automate the process of field analysis and field expansion. For example, some of the existing systems and methods work on the principle of search and replace. However, in such automation cases, the rates of false positives are high. To elaborate this further, while conducting field analysis, these systems may detect some of the variables that may have not being impacted. This therefore, leads to increase in the false positives. Moreover, the existing systems and methods are limited to perform field expansion analysis on particular set of applications mainly applications involving Y2K related problems and fail to work for updating business applications that are required to be updated due to dynamic changing scenarios such as business expansion, business rules change and oversight etc as discussed in the art.

As will be appreciated, there is a long felt need for a system and method that enables an automatic comprehensive impact analysis to perform a field expansion thereby facilitating reduction in the false positives in various legacy or mainframe applications those subjected to update procedures.

OBJECTS OF THE INVENTION

The principal object of the present invention to provide a method and system that enables automatic field analysis and field expansion in mainframe or legacy applications.

Yet another object of the present invention is to provide a system and method for automatic impact analysis enabling identification of the impacted fields in a source code automatically.

Yet another object of the present invention is to enable an option for manual break in the said impact analysis to verify the impacted fields and thereby updating exclusion criteria.

Yet another object of the present invention to enable exclusion of the fields that does not have any impact from field expansion process thereby reducing the false positives during identification of the impacted fields.

Yet another object of the present invention to enable an impact tracker through which how a particular field is impacted can be verified in an impact report.

Still another object of the present invention to automatically convert the source code by expanding the fields identified to be impacted in the source code.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention enables a system and method for conducting automatic field analysis and field expansion in software executing mainframe/legacy applications. The method analyzes a software code to identify and locate the variables impacted due to business changing scenarios. Few of the variables not impacted due to such changes are tracked. Only, the variables that are identified as impacted are subjected to automatic field expansion. The size attributes of such variables are expanded based on the software updating requirements.

A system of the present invention comprises a parsing module, wherein the said parsing module enables to parse a source code to generate attribute and relation files. The generated relation files are stored in a common repository. An impact analyzer module then conducts an impact analysis on user provided seed from the repository. An impact tracker module enables to track few of the seed variables that are not impacted. The system further comprises a control file generator module that generates a control file storing the impacted variables along with their data type and expansion to target size. The system further comprises a converter module that converts the source code by expanding size of the impacted variables using the said generated control file.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and architecture disclosed in the drawings.

DETAILED DESCRIPTION

The description has been presented with reference to an exemplary embodiment of the invention. Persons skilled in the art and technology to which this invention pertains will appreciate that alterations and changes in the described method and system of operation can be practiced without meaningfully departing from the principle spirit and scope of this invention.

The description along with the best enabled mode of the present invention is now described referring to FIGS. 1, 2, 3, 4 and 5

Figure 1:
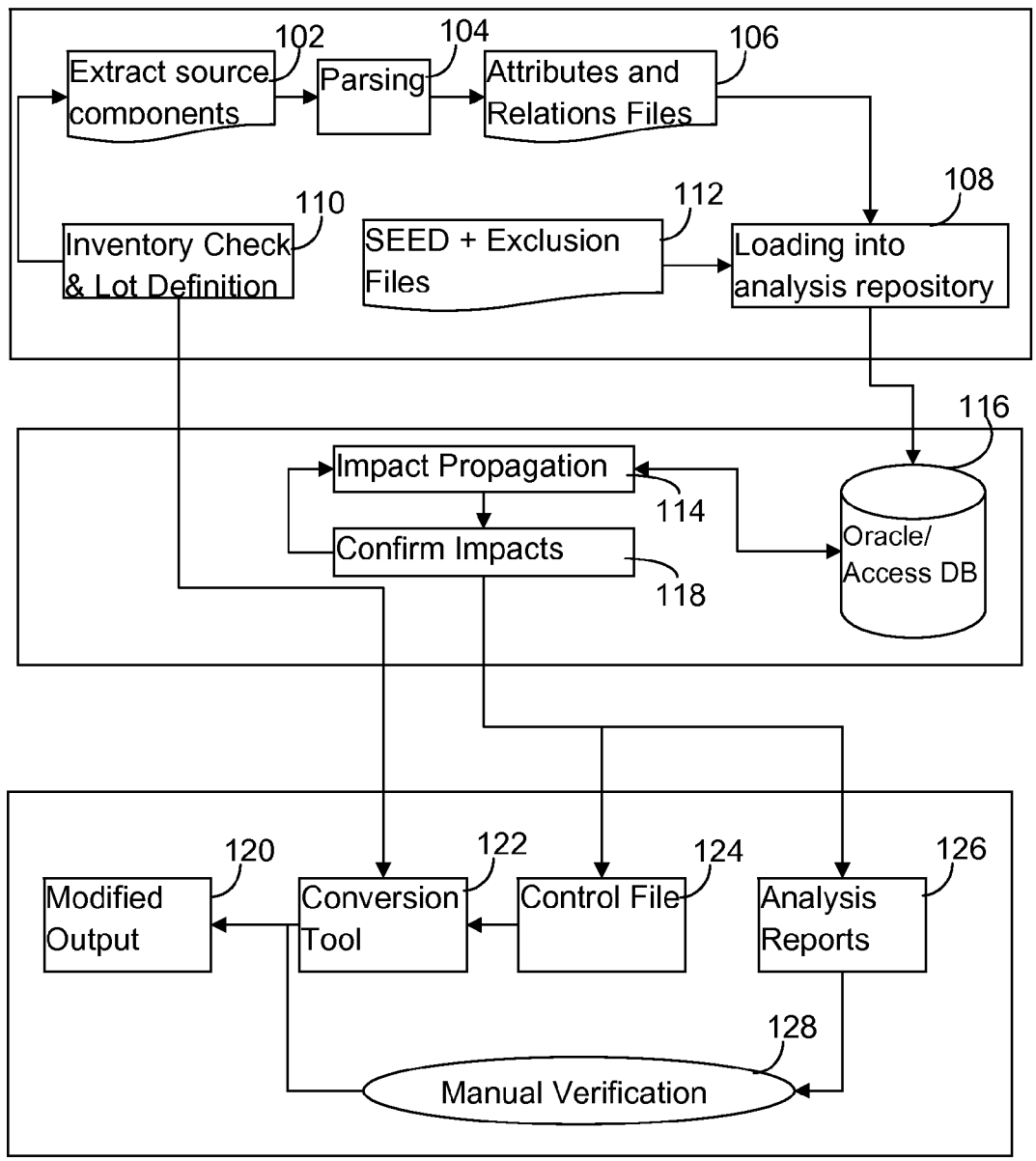
FIG. 1 is a system diagram 100 illustrating field analysis process according to an exemplary embodiment of the invention.

Referring to FIG. 1 is system diagram 100 illustrating field analysis process facilitating various steps in accordance to an exemplary embodiment of the invention.

As shown in the FIG. 1, a field analysis process 100 is initialized by uploading step 102 that uploads the software to be analyzed. Then in the parsing step 104, the software source files of the source code is parsed to generate the attribute and relation files 106. The said generated attribute and relation files 106 are then loaded in a common repository 108. Seed and exclusion files 112 are identified to decide the exact variables or fields on which impact analysis needs to be performed. The seed variable is a list of known pattern of string with its target size. An analysis of common repository 108 is done for impact propagation of seed 114. As a result of impact propagation 114, the impacted locations are identified and confirmed. The identified locations are stored in the software in a repository 116. The analysis report 126 is generated and by using the conversion tool 122 under the direction of control file 124, remediation of the impacted locations is done to obtain a modified output 120.

The process of field expansion is discussed further in detail with reference to FIG. 1. The field analysis process starts with uploading software to be analyzed. The uploading of software requires collating the source code across the system. As indicated in the FIG. 1, the first phase involves extractions of source components 102 of the source code being analyzed. The various steps involved in uploading software include Inventory Extraction, Lot Definition, verification whether complete inventory is available. In the code extraction process a batch job or script can be used to extract production code for select mnemonics.

The next phase in uploading software is Inventory Check and Definition of Lots 110. In this phase, the completeness of the inventory is verified. Such verification is done by the parsing step 104 that displays an error message if some of the components are missing from the extracted source components 102. This process is iteratively performed until the complete inventory is obtained. The components of mnemonics are grouped into one or more lots. Each lot comprises one or more components. The number of components to be hold by each lot is determined based on the number of lines of code it contains. Such grouping of components within plurality of lots is defined such that to minimize component relation across lot as far as possible. A balance is maintained between size of lots and number of lots per mnemonic in order to achieve optimized analysis time. Further, the balance factor can be continuously evaluated and iterated after analyzing few lots and if required updated as per requirements.

The next step in the field analysis process as indicated in FIG. 1 is a parsing phase that comprises parsing of captured components in the finalized inventory. During the parsing phase 104, the source code is parsed syntactically to build an abstract syntax tree. Further, the said abstract syntax tree is traversed to build the list of data items and the relations between various data items in the programs. Such relations between various data items can be determined based on analysis of source code that involves analyzing the declaration and other statements facilitating association of data item or constants in the source code. The attributes and relations files 106 are obtained and are loaded into a common repository called analysis repository 108 for further analysis and field expansion.

The next step in field analysis process is identifying the SEED variables. This is considered to be one of the most important steps for the impact analysis and field expansion process according to an exemplary embodiment. The SEED variables 112 as indicated in FIG. 1 are identified from files, database fields and screen fields. The SEED variables can also be identified from program working variables by specifying the matching patterns like SYM, SYMBOL etc for symbol fields.

The identification of the SEED variables 112 is the further followed by the impact analysis process that is performed at three different levels including Level 1 Analysis, Level 2 Analysis and Level 3 Analysis that performs analysis of impacted variables within the program component, across programs through program calls and across applications/programs through files respectively.

Figure 2:
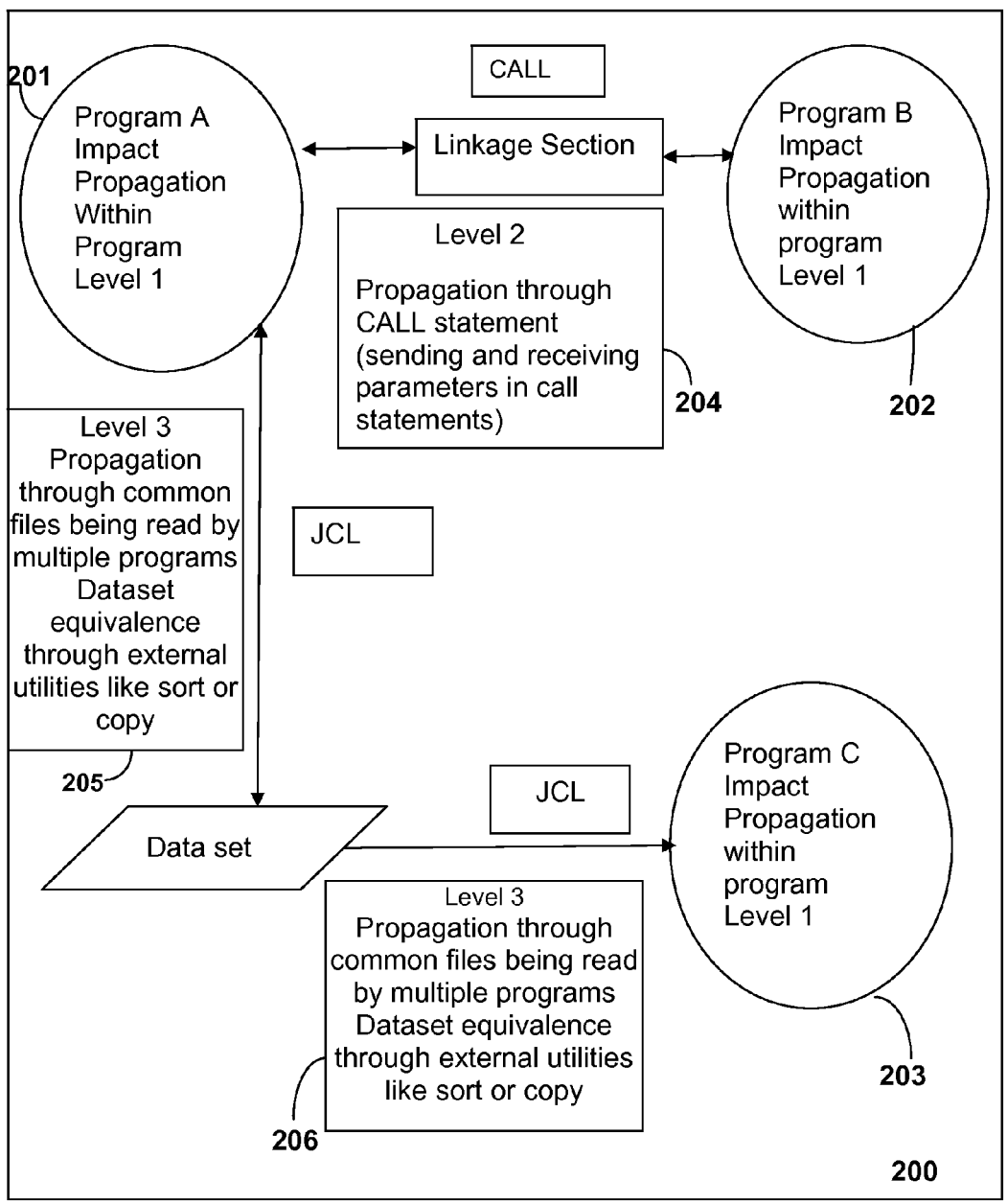
FIG. 2 is a flow diagram 200 illustrating various impact propagation levels during impact propagation process according to an exemplary embodiment of the invention.

Referring to FIG. 2 is a flow diagram 200 illustrating various impact propagation levels during impact propagation process according to an exemplary embodiment of the invention.

In the Level 1 analysis illustrated as 201, 202 and 203 in FIG. 2; the analysis is conducted within the program component. That is, the analysis is done at a single program level. From the SEED variables, the impact can be propagated through various language statements to identify the impacted variables in the software program. Such statements includes data movement, data comparison statements etc in the program. The analysis considers all the language statements for identifying all the impacted variables due to those statements. For example, if there is a data assignment statement wherein the target variable is moved to source and the target is a SEED, then the source is considered as an impacted variable.

If GROUP variables are involved in the data assignment, then the offset information is used to identify the impacted fields. For example, in COBOL language, the impact analysis can be propagated through the group variables. In this scenario, the entire group should not be considered as impacted instead there is a need to identify the exact offset location in which the impact is present. Now, when there is a group move, the impact is propagated using identified offset that helps to reduce the false-positives more accurately.

Consider the following sample code:

| | | |
|---|---|---|
| 01 WS-TEST-VAR. | | |
| 05 WS-VAR-1 | PIC X (5). | |
| 05 WS-VAR-2 | PIC 9(4), | |
| 05 FILLER | PIC X (6). | |
| 01 WS-TEST-VAR-1 | PIC X (15). | |
| 01 WS-TEST-VAR-2. | | |
| 05 WS-VAR-3 | PIC X (3). | |
| 05 WS-VAR-4 | PIC X (2). | |
| 05 WS-TEMP-VAR. | | |
| 07 WS-VAR-5 | PIC 9(4). | |
| 05 WS-VAR-6 | PIC X (6). | |

Consider the following MOVE statements:
MOVE WS-TEST-VAR TO WS-TEST-VAR-1.
MOVE WS-TEST-VAR1 TO WS-TEST-VAR-2.

In an embodiment, assume WS-VAR-3 is the seed variable. Now the definition of WS-TEST-VAR marks the WS-TEST-VAR as impacted at the offset 6 with a length of 4. This impact is carry forward through the first MOVE statement to WS-TEST-VAR-1 at the offset 6 with length 4. Then the impact is further carry forward through the second MOVE statement to WS-TEST-VAR-2 at the offset 6 with a length of 4. Now by the definition of WS-TEST-VAR-2, the variable WS-VAR-5 is identified as the impacted variable since this variable is present in the impacted offset.

Considering the Level 2 analysis illustrated as 204 in FIG. 2, the analysis is performed across programs through program calls considering multiple call chains that are involved in the execution of the software program. For example, in the calling program, if there are any impacted variables identified in the parameters which are passed to another program, then the PDA variables are matched against the calling programs working variables. The offset information is used to derive the exact PDA field which is getting impacted. Now the PDA variable is added in the impacted field list and the level 1 analysis is further carried for the called program.

There are two options provided to handle the dynamic calls:
  1) If the called program name is resolvable within the calling program, then the program name is resolved before start of analysis.
  2) If the called program name is derived from external places in the calling program, then a manual analysis is carried out on the call chain and a cross reference file is created which has the called program names for the variables used in the calling program.

The Level 3 Impact Analysis illustrated as 205 and 206 in FIG. 2 is implemented across applications by considering the impact propagation through various files, queues and other interfaces. All the JCL's are analyzed for the batch programs and all the maps are analyzed for the online programs. In the JCL analysis, the set of equivalent files are identified and subsequently the set of equivalent records are identified. The record variables are mapped to the actual program working variables before the impact analysis starts for the program components. The file equivalence can be derived based on the following:
  a) An output file from program A is the input file for program B. Program A and Program B could belong to two different applications.
  b) A file is copied into another file using a utility. A separate analysis will be carried out to understand all the utilities (which are working on files) and their functionalities.
  c) A file is sorted or merged in the JCL and the output of the sort/merge is moved to another file.

Now again referring to FIG. 1, in the impact propagation phase 114, the impact of the identified seeds 112 through data movements, data comparison, variables passed to called programs (PDA), work-files, data-sets and queues etc are identified. All the three levels of impact analysis as discussed are carried out within each of the lots. Such a three level analysis on each of the lots is done through an impact analysis tool supporting two modes namely:
  a) An automated mode, wherein the said tool propagates all impacts until end of the chain. In this case the end report may contain some unwanted impacts.
  b) A manual confirmation mode using GUI between impacted analysis iterations. The GUI is order to minimize size of unwanted impacts. This can be useful in reducing the false positives involved in the impact analysis. The GUI facilitates to review and confirm impacts 118 for propagation. As can be observed, by default all impacted fields from the iteration are marked for propagation. The user then has the option to further unselect variables that are not required to be propagated suing the GUI.

The Impact Analysis phase is further followed by a cross-lot propagation phase. The said cross-lot propagation is initialized when the propagation for all the lots for a mnemonic is completed. Upon completing propagation within lots, controls flowing out of lots (breaks) are highlighted to be resolved. These could be through:
  a) Program calling/called by a program in another lot of same or different mnemonic.

b) Data-set read/written by JCL belonging to a different lot.

The matching receiving fields in LDA/PDA/GDA in called programs, matching fields for data-set layouts, etc are defined as 'new' seeds and propagation is re-run till completion for the impacted lots. This process is iteratively repeated until there are no unresolved breaks in any of the lots. At this stage the complete control flow is established across all lots.

The propagated components and fields in the software program are marked and stored in the impact database 116 as indicated in FIG. 1 with the line number, location and size. This data can be downloaded based on several out of the box reports or data files referred to as Analysis reports 126 in the FIG. 1. The said Analysis reports 126 may include information including:
 a) List of impacted fields.
 b) Non conformance report containing hard coded data in the program that is closer to seed variables (SYMBOL).
 c) List of call chains with impacted linkage section variables.
 d) Impact Tracker report describing all the variables involved in the impact on a particular variable and all variables in the forward chain i.e. all the variables impacted due to impact of the selected variable.

The reports can be manually verified in the manual verification phase 128 to further track the non-impacted variables. Now, based on these reports, a control file 124 is generated that contains all the impacted fields and the expected target data type and length. As illustrated in FIG. 1, a convertor tool 122 that receives the control file generated 124 and replaces the impacted variables with new data-type and length to obtain the modified output 120.

Figure 3:
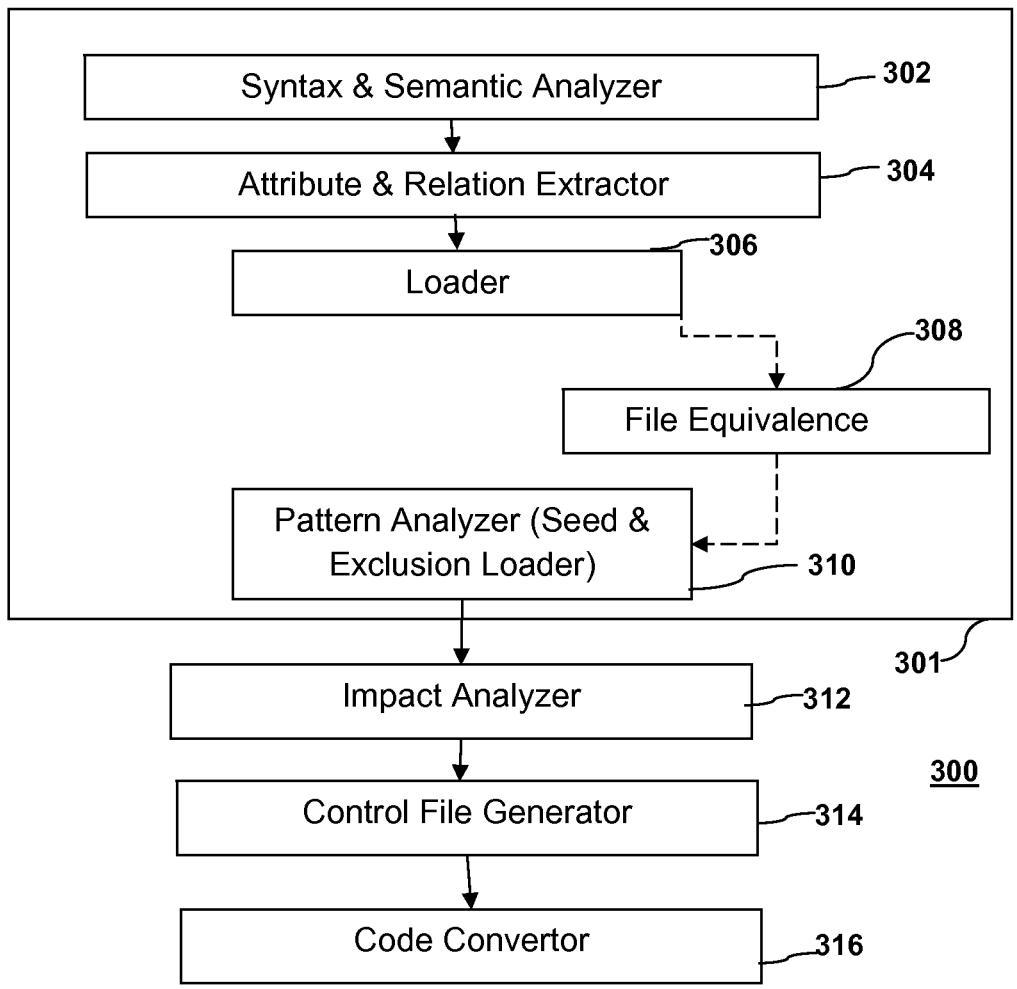
FIGS. 3, 4, and 5 refer to system architecture diagrams illustrating implementation of field analysis system according to an exemplary embodiment of the invention.
Figure 4:
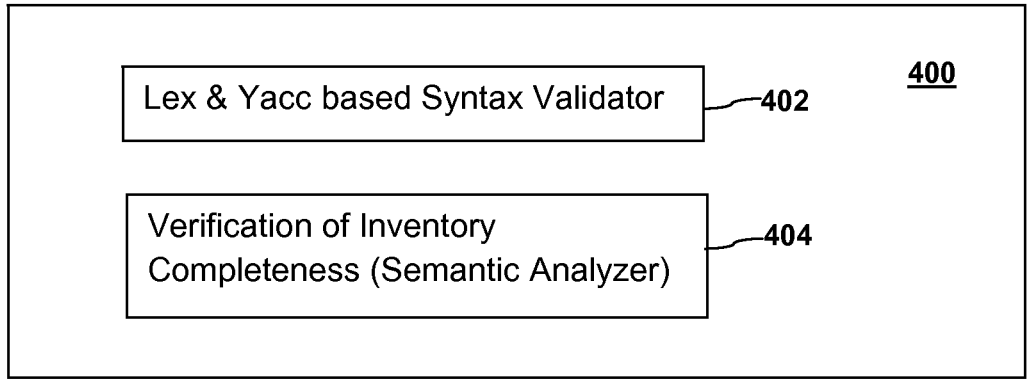
Figure 5:
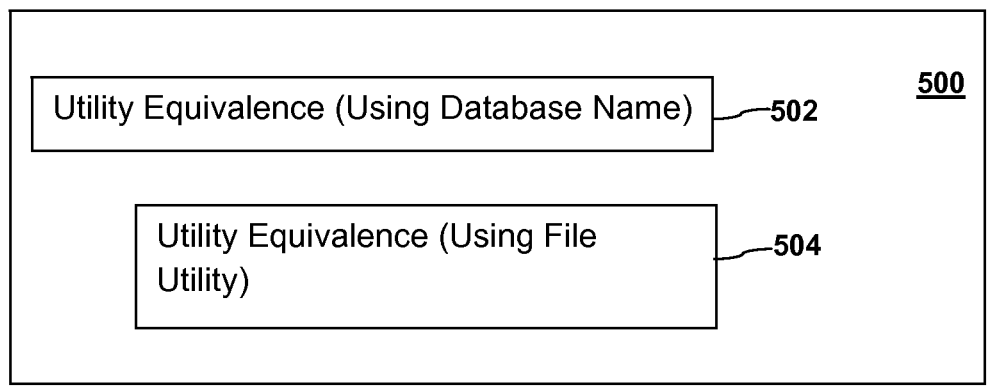

Referring to FIGS. 3, 4, and 5 are system architecture diagrams illustrating various functional modules for implementation of field analysis system according to an exemplary embodiment of the invention. The field analysis system 300 as illustrated in FIG. 3 provides automated field expansion based on the identified seed. The system 300 performs impact analysis on a logical set of source codes to identify the list of impacted fields in a program based on seed variables. The impact analysis is then followed by field remediation that employs resizing of fields as desired by the system requirements. Further, the field remediation also comprises addition and/or elimination of fields in the application components as a result of impact analysis.

The field analysis system 300 as illustrated in FIG. 3 is generally implemented for field analysis process in legacy or mainframe technologies such as COBOL, PL/I, IMS, DB2 and Natural/Adabas etc. The system 300 comprises modules such as Program Analyzer 301, Impact Analyzer 312, Control File Generator 314, and Code Convertor 316.

The Program Analyzer module 301 receives input components in the form of programs to be analyzed along with all copybooks, data items, files, functions and tables associated with the said programs. The Program Analyzer module 301 comprises a Syntax & Semantic Analyzer module 302 that parses the received components by analyzing the source code of these programs syntactically using Lex and Yacc based analysis. Such analysis includes checking for language specific constructs. For example, if the Legacy technology to be analyzed is from IBM related, certain divisions are mandatory and the input components are not parsed successfully even if one of the divisions is missing.

As s result of successful syntax parsing, the completeness of the inventories is validated semantically. The Syntax & Semantic Analyzer module 302 verifies to confirm that all the components referred as inventory components essential for the successful running of the field analysis tool are available for analysis. FIG. 4 illustrates Syntax & Semantic Analyzer system 400 that comprises two modules including Lex & Yacc based Syntax Validator module 402 and Semantic Analyzer 404 that performs the task of syntax parsing and Verification of Inventory completeness respectively as a part of syntax and semantic analysis for the source code to be analyzed.

After the inventory is parsed and validated as a result of syntax & semantic parsing using the Syntax & Semantic Analyzer module 302 as illustrated in FIG. 3, an Abstract Syntax Tree (AST) is built. The said AST typically contains structural details of the program such as line number, and various other parameters of the variables used in each of the statements of the program.

Further, from the information available in the AST, each variable cross reference containing the relations between various data items in the programs are built. Such cross-references also contain details about the files, tables, and copybooks etc used in the program. For example, considering IBM related legacy technology, if data is moved from one data item to another using MOVE statement, the corresponding relationship entry between the two data items would be MOV-MOV. Similarly the other major relations are obtained considering the statements in the program such as COMPARE, ADD, MULTIPLY, SUBTRACT, DIVIDE, COMPUTE, etc.

The Program Analyzer module 301 is language specific and the relations considered vary depending on the language. All major relations are addressed by the system. Such extraction of relations for various attributes, fields and variables etc in the program is done by an Attributer & Extractor module 304 of the Program Analyzer module 301.

The cross reference information and the relations built at application level using the Attributer & Extractor module 304 are then populated into the Analysis Repository. The population of these data into the said Analysis Repository is done by a Loader module 306 comprised in the Program Analyzer module 301 of the field analysis system 300 as illustrated in FIG. 3. The said repository on which the loading is performed is referred as a common repository throughout the system for further analysis and expansion procedure.

As part of analysis, the seeds are identified based on the patterns provided. A pattern analyzer module 310 as illustrated in FIG. 3 determines the seed based on the received patterns. If no patterns are available, the seed information has to be provided to the analysis repository.

A File Equivalence Analyzer module 308 is used to analyze JCLs and relevant procedures to determine the files involved in inventory. FIG. 5 illustrates the functionalities of the File Equivalence Analyzer module 308. Using the file layout information and corresponding physical file details, a database-level 502 analysis is performed using DB name and file utility-level 504 analysis is performed using the functions such as copy, merge, sort, etc. As a result of such analysis performed, the file equivalence is determined. Thus, the File Equivalence Analyzer module 308 as illustrated in FIG. 3 assists is facilitating of an impact-information across the legacy application.

Further, referring to FIG. 3, the field analysis system 300 as illustrated comprises an Impact Analyzer module 312. The said Impact Analyzer module 312, based on the received seed variables, identifies the impacted variables. Generally, such identification of impacted variables is performed iteratively by the Impact Analyzer module 312. This is further explained as follows:

For example, if it is assumed that the Impact Analyzer module 312, based on the pattern received identifies five seeds. Then, these five initial seeds are analyzed and all other variables associated with these seeds are then filtered for valid relations. Assuming that, as a result of this analysis, ten such variables have been identified and filtered as valid relations. These ten variables are then collectively considered as a new seed for the next iteration. In such a manner, iterations facilitating impact analysis continues till there are no further impact that can be propagated.

As a consequence of impact analysis being performed iteratively, there is a chance that few false-positives might also get identified as impacted variable. In that case, these false positives can be excluded to avoid further propagation caused by these false positives patterns/variables. Such variables or patterns to be excluded can be provided by specifying exclusion variables/patterns before starting the impact analysis. This can be done by loading such pattern or variables identified as non-impacted variables by the Seed & Exclusion Loader 310 on the impact analyzer module 312 before initiating the impact analysis. This will therefore enable in reduction of false positives.

In the system, the impact could be based on various semantics of a particular software language. Further, the Impact analyzer module 312 also provides an option that enables stopping of the impact analysis after each iteration in order to verify the impacted fields and accordingly update the exclusion criteria. The impact analyzer module 312 then based on performed impact analysis generates an impact report. The impact report generated is then exported and validated. The impact report typically contains details of all the impacted variables, along with details of the tables, copybooks, program details, and call chain details, if any.

Apart from impact on data items or variables used in the input components, Non-Conforming Usage (NCU) of variables is also captured in the system. These typically represent the impact caused by constants on the list of impacted variables identified. Using this report, any further changes required in input, based on constants can be identified with more ease.

Based on the conversion rules given, using the set of impacted variables identified earlier, Control File Generator Module 314 as illustrated in FIG. 3, generates the control file that contains all the impacted fields and the expected target data type and length to be revised for the said impacted fields. The generation of such a control file is software language specific and is designed based on the size and memory allocated for each type of variable in bytes.

As illustrated in FIG. 3, the filed analysis system 300 further comprises a Code Convertor module 316 that receives the control file generated from the Control File Generator Module 314. The Code Convertor module 316 parses the input programs and replaces the impacted variables with new data-type and length. The Convertor module 316 is also language specific. Thus, for each language that the system supports, a separate Program Convertor module is required.

Best Enabled Mode

In an exemplary embodiment, the present invention is implemented for identifying the impacted fields in the following examples of source codes.

Example 1

```
012590  MOVE SV101-2-PROCEDURE-CODE-0618(WS-SUB1)
012591    TO EF-TEST-PROC-CODE
000043  01 EF-UNLISTED-CODES-LIST.
000044   05 EF-TEST-PROC-CODE        PIC X (05).
000045    88 UNLISTED-PROCEDURE      VALUES '01999'
```

-continued

```
000046                              '15999'
000047                              '17999'
000048                              '19499'
000049                              '20999'
012610  IF NO-NOTE-TEXT
012611  IF UNLISTED-PROCEDURE
012612    PERFORM 1320-PROCESS-99070-REMARK
012613    THRU 1320-EXIT
012614  END-IF
012615  END-IF
```

As can be observed, the impact is generated due to data movement statement in the above example source code as follows:

In this exemplary embodiment, the first impact is generated from the "MOVE" statement and then the impacted variable has an 88 flag that leads to create impact in the IF statement.

Example 2

Consider the below source code comprising sample definitions and the IF statements:

```
01 WS-VAR-COMPARE-1
 05 WS-VAR-COMP      PIC X (10)
    IF WS-VAR-COMP = "1234ABCDXY" THEN
```

In an exemplary embodiment, assuming that the WS-VAR-COMP is impacted at the offset 5 with a length of 4, then the method identifies the string "ABCD" as an impacted which needs to be modified or expanded.

Example 3

Impact Resulted Through Calls Across Programs

Consider the below sample of program TEST19 calling TEST20. Here the WS-CODE is the impacted variable in program TEST19

```
PROGRAM TEST19:
 01 WS-TO-CALL-ANOTHER.
 05 WS-CODE    PIC 9(3).
 CALL "TEST20" USING WS-TO-CALL-ANOTHER.
PROGRAM TEST20:
 LINKAGE SECTION.
 01 FROM-ANOTHER-PGM.
 05 LK-INPUT       PIC 9(3).
 05 LK-OUTPUT   PIC X (50).
```

In an exemplary embodiment, the program TEST20 is impacted by call linkage through program 19. The variable "FROM-ANOTHER-PGM" in the program TEST20 is impacted due to calling variable "WS-TO-CALL-ANOTHER" affected due to send-receive relation between the two programs. In the exemplary embodiment of the present invention, "LK-INPUT" in the program TEST20 is identified as the impacted variable through the linkage from the calling program.

The methodology and techniques described with respect to the exemplary embodiments can be performed using a machine or other computing device within which a set of instructions, when executed, may cause the machine to perform any one or more of the methodologies discussed above. The machine may comprise a server computer, a client user computer, a personal computer (PC), a tablet PC, a laptop computer, a desktop computer, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a memory which communicate with each other via a bus. The machine may further include a video display unit (e.g., a liquid crystal display (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device. The memory stores the instructions when executed, may cause the processor of the machine to perform any one or more of the methodologies discussed above.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

ADVANTAGES OF THE INVENTION

The present invention has following advantages:

The present invention enables automatic identification of impacted variables in the legacy applications.

The present invention enables exclusion of few set of variables that are identified as non-impacted from the field analysis thereby reducing the false positives.

The present invention supports field expansion analysis of software program of different software languages.

The invention claimed is:

1. A method for expanding a size of a field associated with a plurality of variables present in a source code of at least one software application, the method comprising processor implemented steps of:
  receiving said source code in at least one source language;
  parsing said source code to generate an abstract syntax tree (AST), wherein the AST comprises relation amongst the plurality of variables, and wherein the relation is stored in a repository;
  identifying a first set of seed variables from the plurality of variables, wherein the first set of seed variables is identified based on,
    a) matching of a pattern pertaining to the field received from a user with patterns of fields associated with the plurality of variables, or
    b) one or more files, one or more database fields, or one or more screen fields;
  performing multi-level impact analysis on the first set of seed variables in order to identify a second set of seed variables, wherein performing the multi-level impact analysis further comprises excluding one or more seed variables from the second set of seed variables, wherein the one or more seed variables indicative of non-impacted variables, and wherein the exclusion of the non-impacted variables facilitates in reduction of the false positives;
  generating an analysis report comprising the first set of seed variables and the second set of seed variables, wherein the analysis report facilitates to further exclude at least one seed variable from the first set of seed variables or the second set of seed variables in order to derive a set of impacted variables, thereby further facilitating to reduce the false positives; and
  expanding the size of a field associated with each seed variable of the set of impacted variables.

2. The method of claim 1, wherein the at least one source language is selected from a group comprising COBOL, PL/I, IMS, DB2, Natural/Adabas and combinations thereof.

3. The method of claim 1, wherein the parsing of the source code includes syntax and semantic analysis to generate the abstract syntax tree (AST) comprising structural details of the source code.

4. The method of claim 3, wherein the AST is analyzed to generate the at least one attribute and relation file.

5. The method of claim 4, wherein the at least one attribute and relation file comprises at least one variable or field in the source code with its relationship with various one or more files, tables, functions, copybooks and combinations thereof in the source code.

6. The method of claim 1, wherein the multi-level impact analysis is performed to generate an impact report containing details of at least one impacted variable and the related files, tables and function call details from the first set of seed variables.

7. The method of claim 1, wherein the multi-level impact analysis is configured to perform offset tracking that comprises locating at least one impacted bit in the at least one impacted variable.

8. The method of claim 1, wherein the multi-level impact analysis is verified by stopping the multi-level impact analysis in between to identify at least one variable that is not impacted.

9. The method of claim 8, wherein the identification step includes locating at least one bit of the at least one variable that is not impacted.

10. The method of claim 1, wherein the final set of seed variables are expanded based on a specified target data type, length, size and memory allocated.

11. The method of claim 1, wherein the multi-level impact analysis comprises:
  a. identifying, in a first level, a first set of impacted variables present in a part of the source code,
  b. identifying, in a second level, a second set of impacted variables present in another part of the source code, and
  c. identifying, in a third level, a third set of impacted variables present in an another source code of an another software application associated with the software application, wherein the first set of impacted variables, the second set of impacted variables, and the third set of impacted variables, impacted by the first set of seed variables, indicates the second set of seed variables, and wherein the second set of seed variables is identified by using the relation amongst the plurality of variables.

12. A system for expanding a size of a field associated with a plurality of variables present in a source code of at least one software application, the system comprising:
  a processor; and
  a memory, coupled to the processor, to store instructions that, when executed by the processor, cause the processor to:
    receive said source code in at least one source language;
    parse said source code to generate an abstract syntax tree (AST), wherein the AST comprises relation amongst the plurality of variables, and wherein the relation is stored in a repository;
    identify a first set of seed variables from the plurality of variables, wherein the first set of seed variables is identified based on,
      a) matching of a pattern pertaining to the field received from a user with patterns of fields associated with the plurality of variables, or
      b) one or more files, one or more database fields, or one or more screen fields;
    perform a multi-level impact analysis on the first set of seed variables in order to identify a second set of seed variables, and wherein the multi-level impact analysis is further comprises exclusion of one or more seed variables from the second set of seed variables, and wherein the one or more seed variables indicative of non-impacted variables and wherein the exclusion of the non-impacted variables facilitates in reduction of the false positives;
    generate an analysis report comprising the first set of seed variables and the second set of seed variables, wherein the analysis report facilitates to further exclude at least one seed variable from the first set of seed variables or the second set of seed variables in order to derive a set of impacted variables, thereby further facilitating to reduce the false positives; and
    expand the size of a field associated with each seed variable of the set of impacted variables.

13. The system of claim 12, wherein the at least one source code is written in a language that is selected from a group comprising COBOL, PL/I, IMS, DB2, Natural/Adabas and combinations thereof.

14. The system of claim 12, wherein the at least one attribute and relation file comprises at least one variable or field in the source code with its relationship with various one more files, tables, functions, copybooks and combinations thereof in the source code.

* * * * *